United States Patent [19]

Roczynski et al.

[11] 3,862,815

[45] Jan. 28, 1975

[54] RECORD PRODUCING APPARATUS

[75] Inventors: Joseph P. Roczynski, Branford; Chester P. Roczynski, Guilford, both of Conn.

[73] Assignee: Valley Metallurgical Processing Co., Inc., Greenwich, Conn.

[22] Filed: July 20, 1973

[21] Appl. No.: 380,962

[52] U.S. Cl................... 425/116, 425/123, 425/406, 425/810, 425/128, 425/455, 425/302

[51] Int. Cl............................................... B29h 17/00

[58] Field of Search........... 425/109, 112, 116, 123, 425/135, 810

[56] References Cited

UNITED STATES PATENTS

| | | | |
|---|---|---|---|
| 2,743,478 | 5/1956 | Harlow et al. | 425/109 |
| 3,186,029 | 6/1965 | Joseph | 425/123 |
| 3,329,997 | 7/1967 | Rand et al. | 425/112 |
| 3,412,427 | 11/1968 | Flusfeder et al. | 425/109 |
| 3,526,690 | 9/1970 | Bachman | 425/135 X |
| 3,528,127 | 9/1970 | Doman et al. | 425/116 |
| 3,557,406 | 1/1971 | Stausfeld | 425/123 |
| 3,635,622 | 1/1972 | Wechsler | 425/116 |
| 3,662,051 | 5/1972 | Harlow et al. | 425/109 |
| 3,663,136 | 5/1972 | Westermann | 425/116 |
| 3,702,749 | 11/1972 | Flusfeder et al. | 425/109 |

*Primary Examiner*—J. Howard Flint, Jr.
*Attorney, Agent, or Firm*—Walter Spruegel

[57] ABSTRACT

Record producing apparatus, having a record molding press, a record trimming station remote from the press, and a record transfer carriage carrying a turntable and being movable, with the turntable in horizontal disposition, into one position in which the turntable receives a molded record in the open press, and into another position in which the turntable is at the trimming station and a record thereon is driven together with the turntable for trimming the peripheral flash from the record.

15 Claims, 12 Drawing Figures

BY

RECORD PRODUCING APPARATUS

This invention relates to the production of disc records in general, and to apparatus for producing disc records in particular.

Apparatus of the type with which the present invention is concerned operate automatically in successive cycles during each of which a disc record is produced, with each cycle providing for the forming of a plastic biscuit, transfer of the biscuit and top and bottom labels to a molding press in which there is formed a labeled record with excess plastic in the form of peripheral flash, transfer of the formed record from the molding press to a finish station at which the peripheral flash on the record is trimmed off, and transfer of the trimmed record from the finish station to a collecting station. Moreover, for efficiency of operation of such apparatus, successive operating cycles are timewise overlapping, in that a biscuit is being formed while the preceding biscuit is being molded into a record, and the record preceding the latter is being trimmed.

In opening the molding press in apparatus of this type on the concluded formation of each record, the latter must be separated from the master dies or "stampers" and held for the transfer of the record from the press to the finish station. To this end, recourse is customarily had to gripping fingers which are open and positioned to receive the peripheral flash on the record as it runs out from the stampers in pressing the record, whereupon the fingers are closed on the flash and activated to separate the record from the stampers and assume sole hold of the record as the press opens. With these fingers already holding the record in the open press, they are called upon to continue the hold of the record for its transfer to the finish or trimming station, and the fingers are to this end mounted on a transfer slide or carriage. Separation of the record from the stampers and its transfer to the trimming station in this fashion leaves the record intact for later sound reproduction of the recording thereon, this despite some sagging of the still hardening record during its peripheral hold by the gripping fingers. Among prior apparatus of this type there are also some which provide a single reciprocable main carriage, not only for the transfer of a record from the press to the trimming station, but also for the transfer to the press of a plastic biscuit and top and bottom labels from a biscuit-forming and label-supply station, with the carriage mounting the aforementioned gripping fingers for separating a record from the stampers in the press and holding it during its transfer to the trimming station. In order to operate in this fashion, the biscuit-forming and label supply station and the trimming station are arranged behind and in front, respectively, of the press, with the carriage performing its record, biscuit and label transfer functions on each forward stroke from the biscuit-forming and label supply station, and on each return stroke to the latter station returning the gripping fingers to the press in readiness for the next record to-be-molded therein.

It is among the objects of the present invention to provide apparatus of this type in which the hold of a record on its periphery only, and such sagging of the record this may entail, is tolerated only in the brief course of its separation from the stampers, and the record is during, and even before, its transfer from the press to the trimming station supported throughout its planar extent and also locked to its support against inertial displacement thereon. To this end, a separated record is transferred from the open press to the trimming station by a movable carriage with a flat top surface on which the record rests, and which is provided with a projecting pin on which the formed center hole in the record is received, and record separating means in the preferred form of gripping fingers are permanently mounted at the press and actuated for their sole function of separating a record from the stampers and lowering it onto the flat carriage surface and with its center hole into register with the pin thereon, with the record remaining on this carriage surface not only during its transfer to the trimming station, but also while undergoing a trimming operation at this station. With this arrangement also, the flat record support surface becomes a part of the trimming component, not only because a record is supported thereon while undergoing a trimming operation, but also because the pin on this support surface, on which the record is located with its center hole, is a convenient and accurate reference center for the actual trimming elements and their accurate performance on the record concentric with its center hole.

It is another object of the present invention to provide apparatus of this type in which the aforementioned flat record support surface of the carriage is not a surface of the carriage, but is provided by a turntable on the carriage, and the trimming elements are power-driven companion shear discs at the trimming station, and the trimming component further includes an operating disc which at the trimming station is movable, coaxially of the turntable thereat, into a down position in frictional driving engagement with a record on the turntable, and into an up position in which the same clears the turntable for periodic operational travel of the latter with its carriage from the trimming station to the press and back to the trimming station, with this operating disc being in its down-position also power-driven for the drive of the turntable and a record thereon relative to the shear discs and ensuing progressive trimming by the latter of the record periphery. With this arrangement, the shear discs may be driven continuously, and so located on one side of a record on the turntable that they cut straight into the flash on the record to a point of the final record periphery during a last stage of the transfer of the record on the turntable to the trimming station, so that on arrival of the record at the latter station and during its following drive by the operating disc the driven shear discs will complete the trimming of the record to its final periphery.

It is a further object of the present invention to provide apparatus of this type in which a single linearly reciprocable main carriage performs not only the function of transferring a plastic biscuit and top and bottom labels from a biscuit-molding and label-supply station to the press, but also the function of transferring a separated record from the press to the trimming station, with this main carriage providing, for the latter transfer function and also for the support of the record while being trimmed the aforementioned turntable. With this arrangement, there are secured the structural and operational advantages of the single reciprocable main carriage of the aforementioned prior apparatus, but even more important, the trimming station must, for operability of the single main carriage, be arranged on the same side of the press on which the biscuit-molding and label-supply station is arranged, thereby securing still further advantages. Thus, with the trimming station and the biscuit-molding and label-supply station being behind the press, the latter is fully exposed at, and directly accessible from, all sides except the rear, which has obvious advantages, inclding easy and close inspection at any time of the overall performance of the apparatus at the press station at which a malfunction of any of the operating components except the trimming component leaves a most telling mark in the ensuing readily-perceptible defect in a record. Further, all operating components of the apparatus, including the press, may be designed with sole regard to their structural simplicity, least bulk, and arrangement in individual preassembled units which lend themselves to ready assembly with each other, all with a view toward efficient and low-cost mass-type manufacture of apparatus and their most reliable and efficient performance, as well as ready maintenance of the same.

Another object of the present invention is to provide apparatus of this type with a record storage station and a transport for a finished record from the trimming station to the storage station, with the aforementioned operating disc of the trimming component advantageously serving also to hold a finished record for its transfer to the storage station. To this end, the operating disc is provided in previously known manner with vacuumatic record holding means, but this disc, including its power drive and axial-shift means, is mounted on a second carriage which is separate from the main carriage and guided for movement from the trimming station to the collecting station. With this arrangement, the storage station may be arranged at any convenient place on the apparatus at which collected records are freely accessible for removal, and which is well out of the way of the coordinated operating components of the apparatus in producing records up to and including their peripheral trim. Further, while the molding cycle of a record in the press being unavoidably the longest, in point of time, among the cycles of all operating components, and the time involved in transferring a plastic biscuit and labels from the biscuit-forming and label-supply station to the press being a factor in the record production capacity of the apparatus, the record trimming operation during a record molding cycle may be completed during a small fraction of the duration of the latter, leaving ample time during the same record molding cycle to transfer a trimmed record on the other carriage from the trimming station to the storage station at a speed which is no factor in the record production capacity of the apparatus, and at which the vacuumatic hold of the record on the operating disc is least likely to be broken.

Further objects and advantages will appear to those skilled in the art from the following, considered in conjunction with the accompanying drawings.

In the accompanying drawings, in which certain modes of carrying out the present invention are shown for illustrative purposes:

Figure 1:
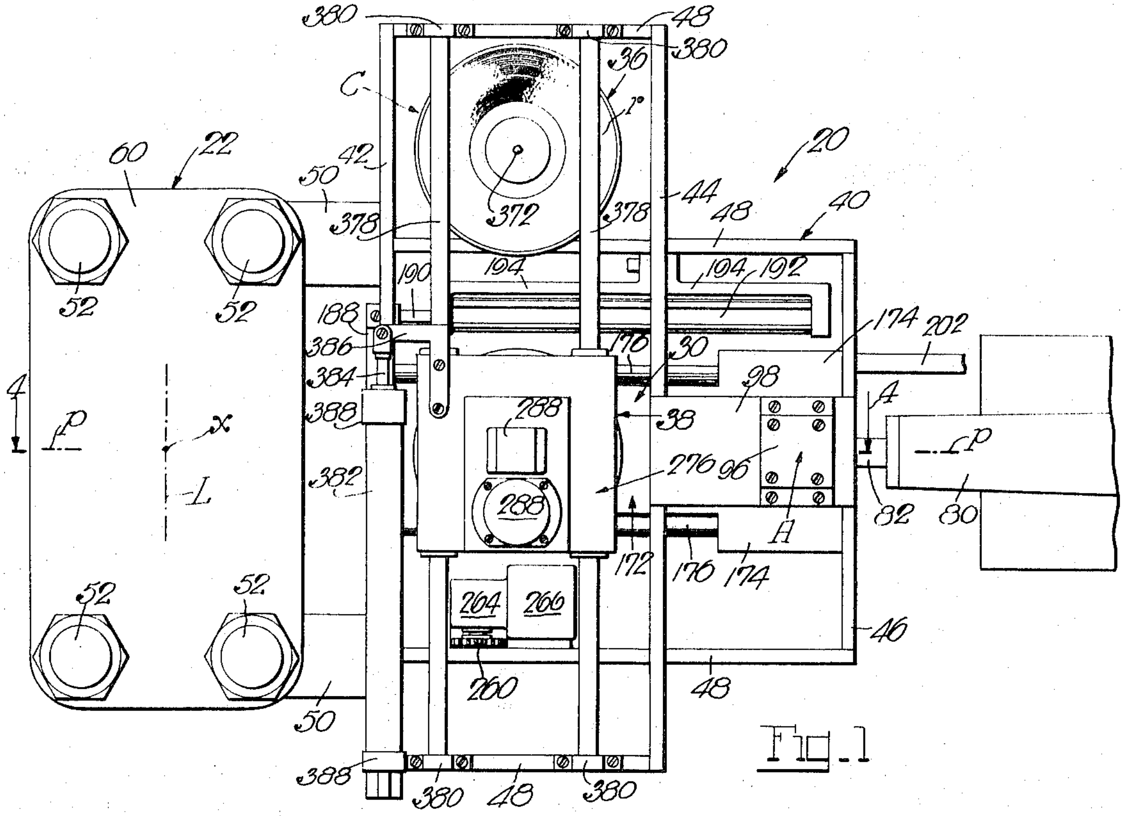
FIGS. 1 to 3 are top, side and front views, respectively, of apparatus embodying the invention.
Figure 2:
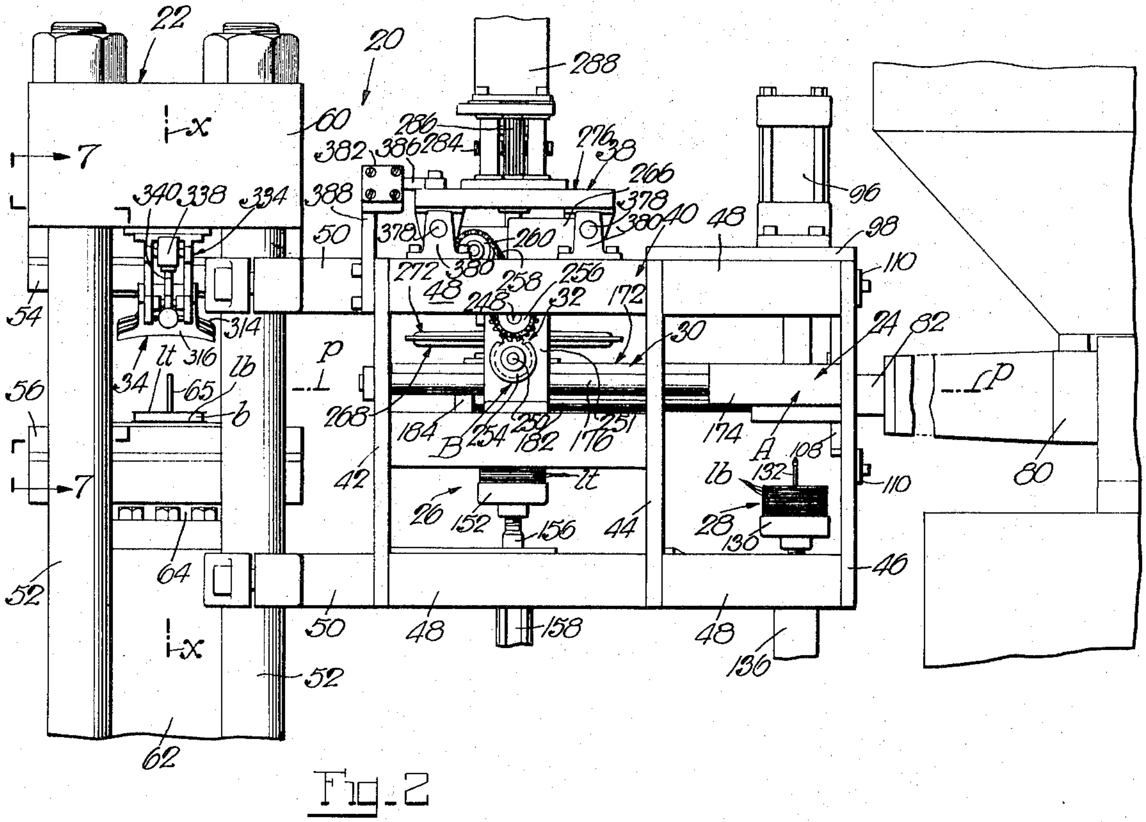
Figures 3, 10, 12:
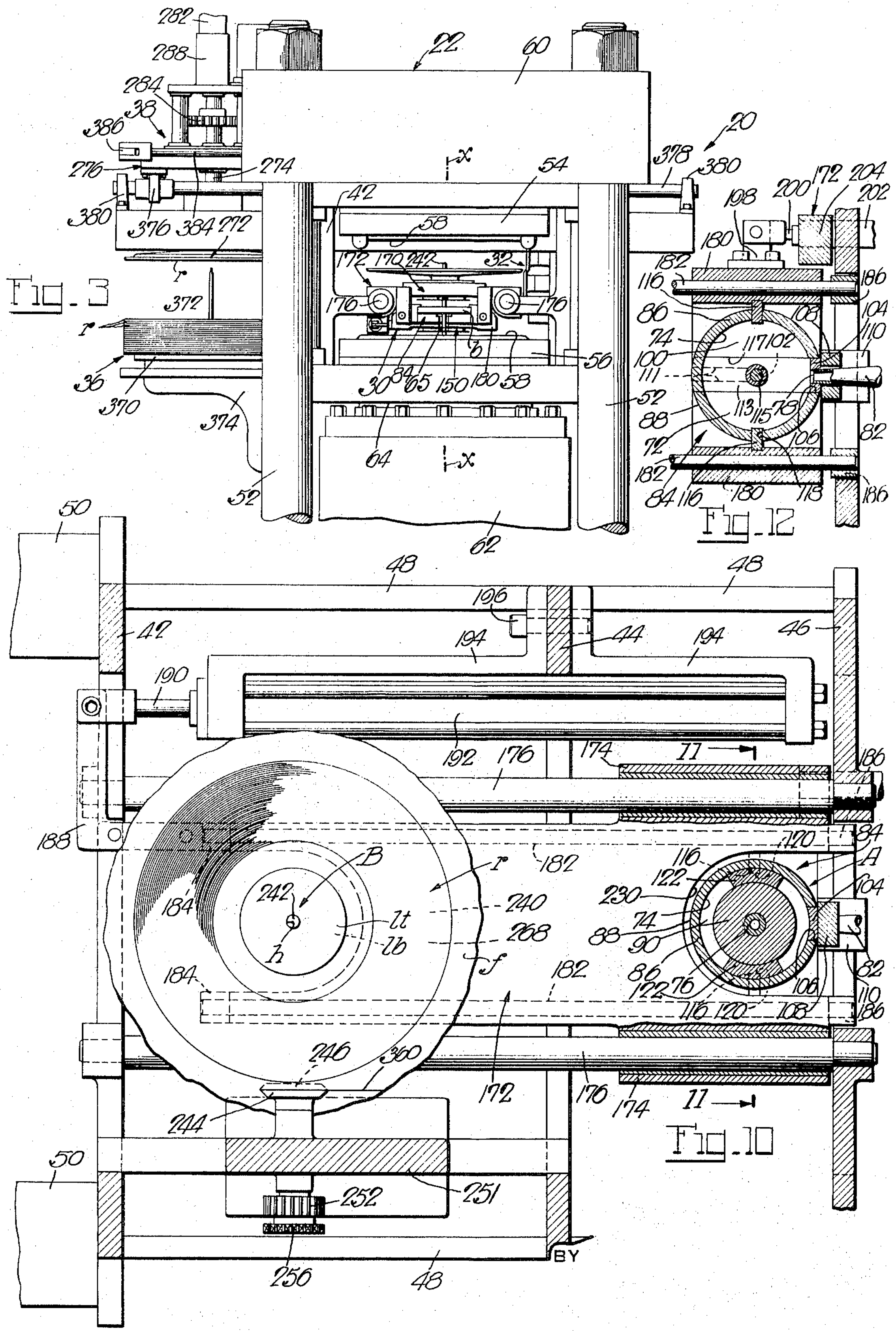
FIG. 10 is a fragmentary section through the apparatus taken substantially on the line 10—10 of FIG. 4.
FIG. 12 is a reduced fragmentary section substantially on the line 12—12 of FIG. 11.

Referring to the drawings, and more particularly to FIGS. 1 to 3, there is shown record producing apparatus 20 which has as its major operating components a record molding press 22, biscuit-forming means 24, top and bottom label supply means 26 and 28, biscuit and label transfer means 30, record trimming means 32, record transfer means 34, record stacking means 36, and other record transfer means 38. The apparatus also provides a frame 40 which in this instance is mounted on the press and carries all other operating components 24 to 38. The frame 40 is in this instance articulated, and comprises spaced front, intermediate and rear plates 42, 44, 46 and side plates 48 which join the plates 42 to 46, with the frame 40 being, by clamping brackets 50 on its front plate 42, mounted on rear columns 52 of the press.

THE PRESS

Figure 4:
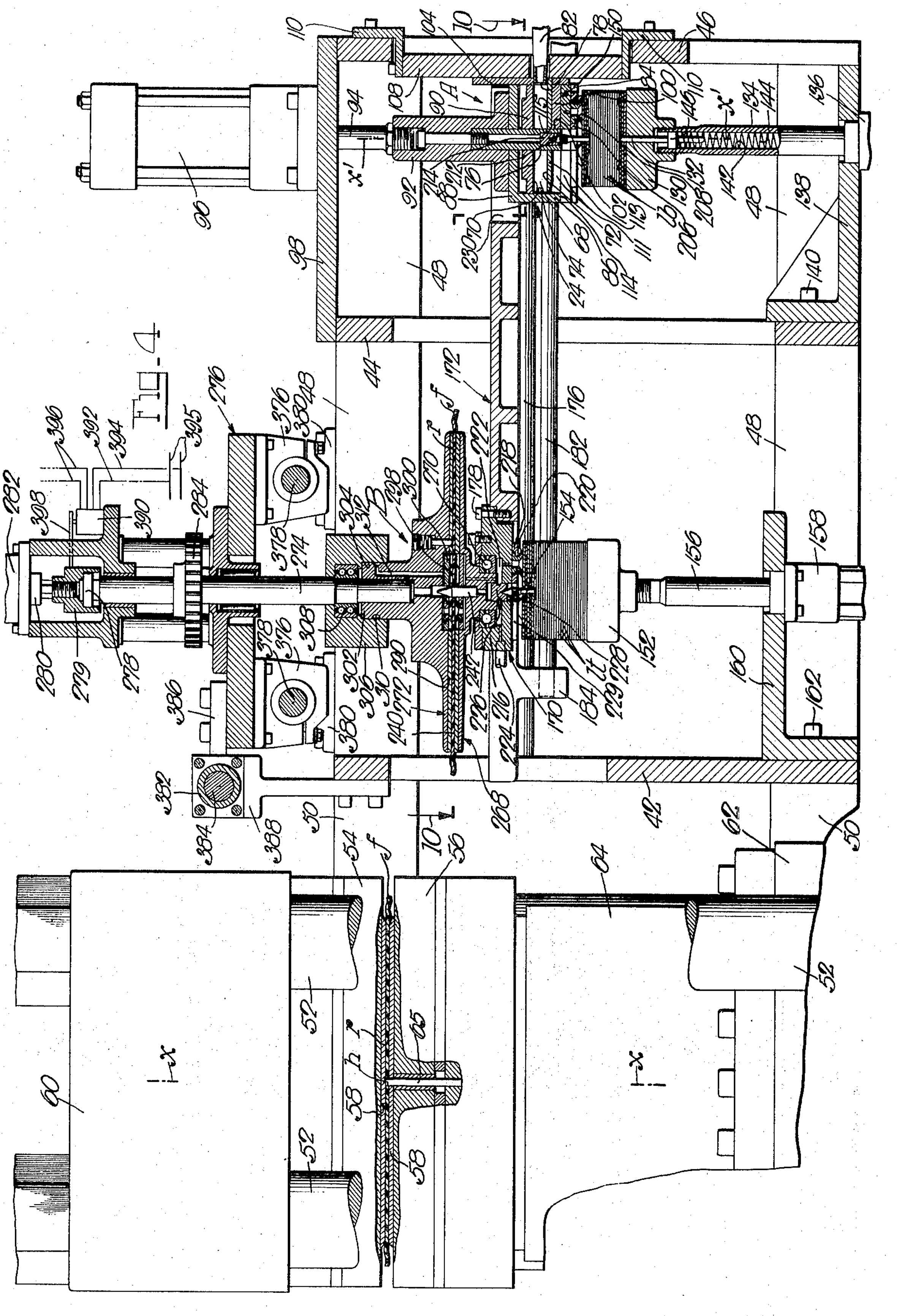
FIG. 4 is an enlarged longitudinal section through the apparatus taken substantially on the line 4—4 of FIG. 1.
Figure 7:
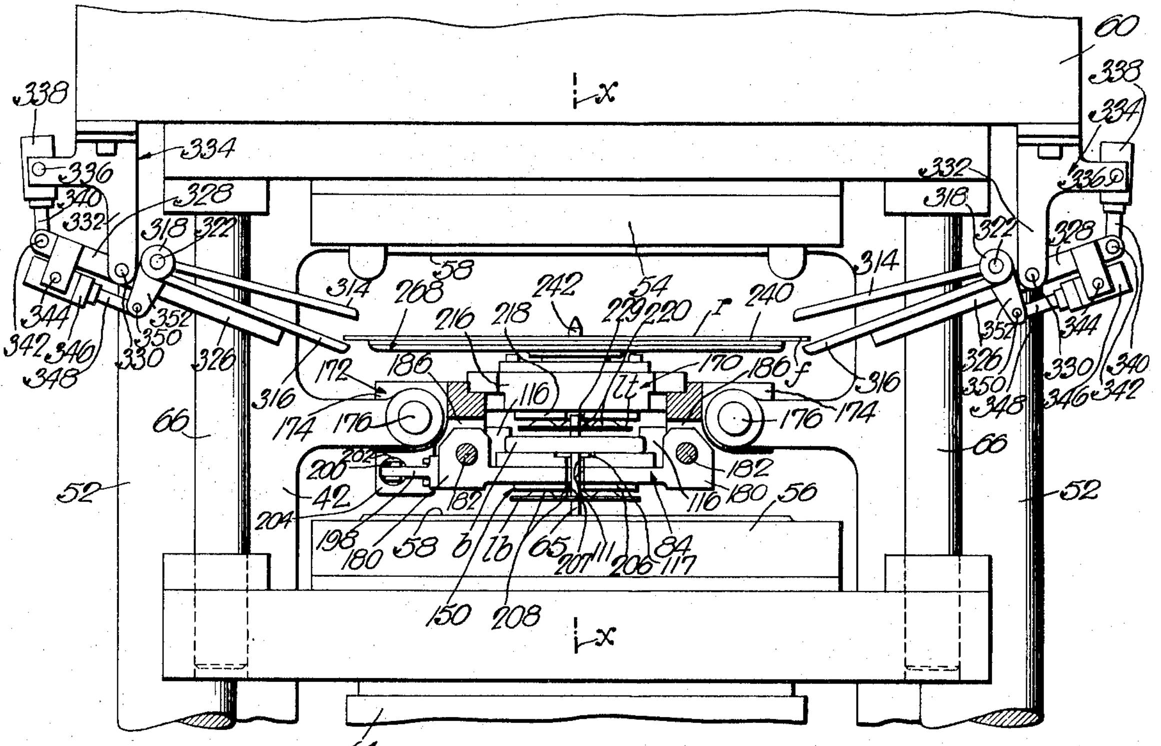
FIG. 7 is an enlarged fragmentary front view, partly in section, of the apparatus.
Figures 8, 9:
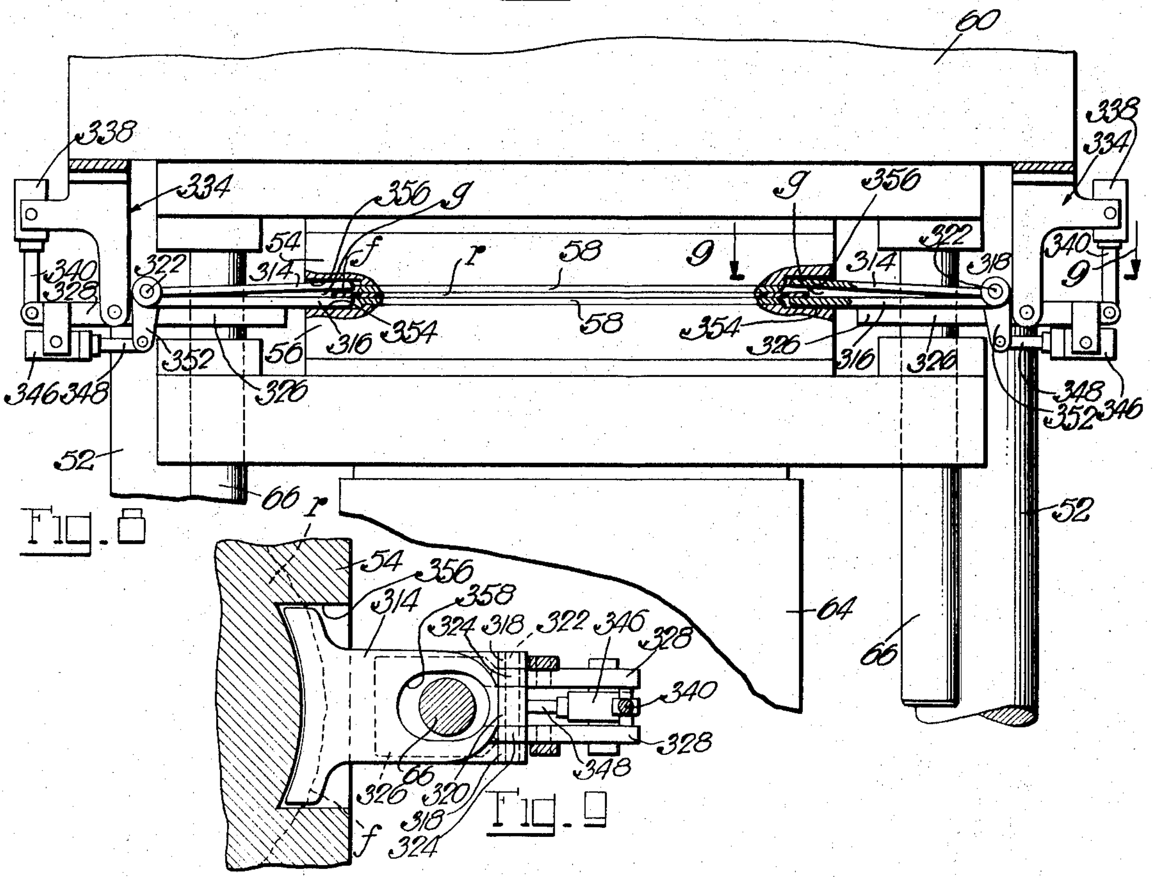
FIG. 8 is a view similar to FIG. 7, but showing certain operating components of the apparatus in different positions.
FIG. 9 is a fragmentary section through the apparatus taken substantially on the line 9—9 of FIG. 8.

The press 22 provides companion platens 54 and 56 which are relatively movable to and from each other to close and open the press and to mold in the closed press a plastic biscuit into a disc record *r* with a center hole *h* and peripheral flash *f*, and in this instance also with top and bottom lables 1*t* and 1*b* (FIGS. 4 and 10). The companion platens 54 and 56 are in this instance upper and lower platens, of which the lower platen 56 is movable to and from the stationary upper platen 54, with these platens carrying the usual master stampers 58 for pressing the record (see also FIGS. 4 and 8). The upper platen 54 is mounted on the press head 60 which in turn, is mounted on upright columns 52 on the base 62 of the press. The lower platen 56 is carried on top of a ram 64 which is guided for vertical movement in the base 62 and moved up and down by hydraulic cylinder and plunger action in the base 62. The lower platen 56 also carries a pin 65 centered on a vertical reference axis *x* of the press. In the closed press, the center pin 65 bears against the master stamper on the upper platen 54 for forming the center hole *h* in a record being molded (FIG. 4), with this pin 65 being in the lower platen 56 suitably operated, preferably hydraulically, to project in the open press into the position in FIGS. 2, 5 and 7, and to yield downwardly when engaging the stamper on the upper platen in the course of closing the press. The press platens 54 and 56 have usual provisions for cyclic circulation therein of heating and cooling liquids in molding a record and expediting its hardness after molding for early removal of the record in intact condition from the press. For accurate alignment of the master stampers 58 in operation, the lower platen 56 is further guided on depending posts 66 on the upper platen 54 (FIGS. 3, 7 and 8).

BISCUIT-FORMING MEANS

Figures 6, 11:
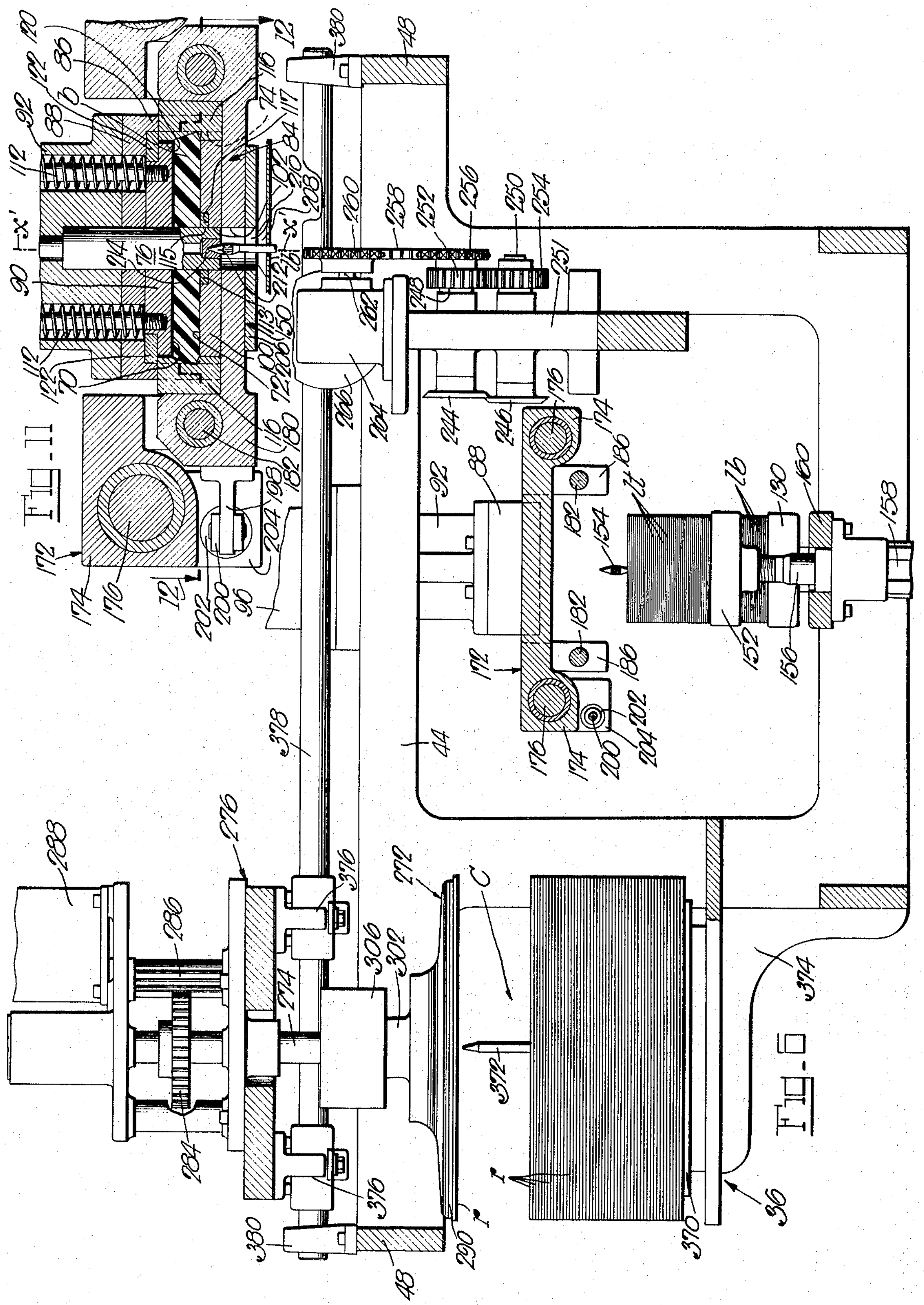
FIG. 6 is a cross-section through the apparatus taken substantially on the line 6—6 of FIG. 5.
FIG. 11 is an enlarged fragmentary section through the apparatus taken substantially on the line 11—11 of FIG. 10.

The biscuit-forming means 24 are provided at a station A remote from the press 22 (FIGS. 1, 2 and 4), and provide a mold cavity 68 in which extruded plastic is formed into a ring-shaped biscuit *b* (FIG. 11). The cavity 68 has top and bottom walls 70 and 72, a peripheral wall 74 which is annular about a vertical axis *x'*, and a center core 76 (FIGS. 4, 11 and 12), with the cavity also having a port 78 for injection of a charge of molten plastic from a conventional extruder 80 through a discharge nozzle 82 thereof.

Figure 5:
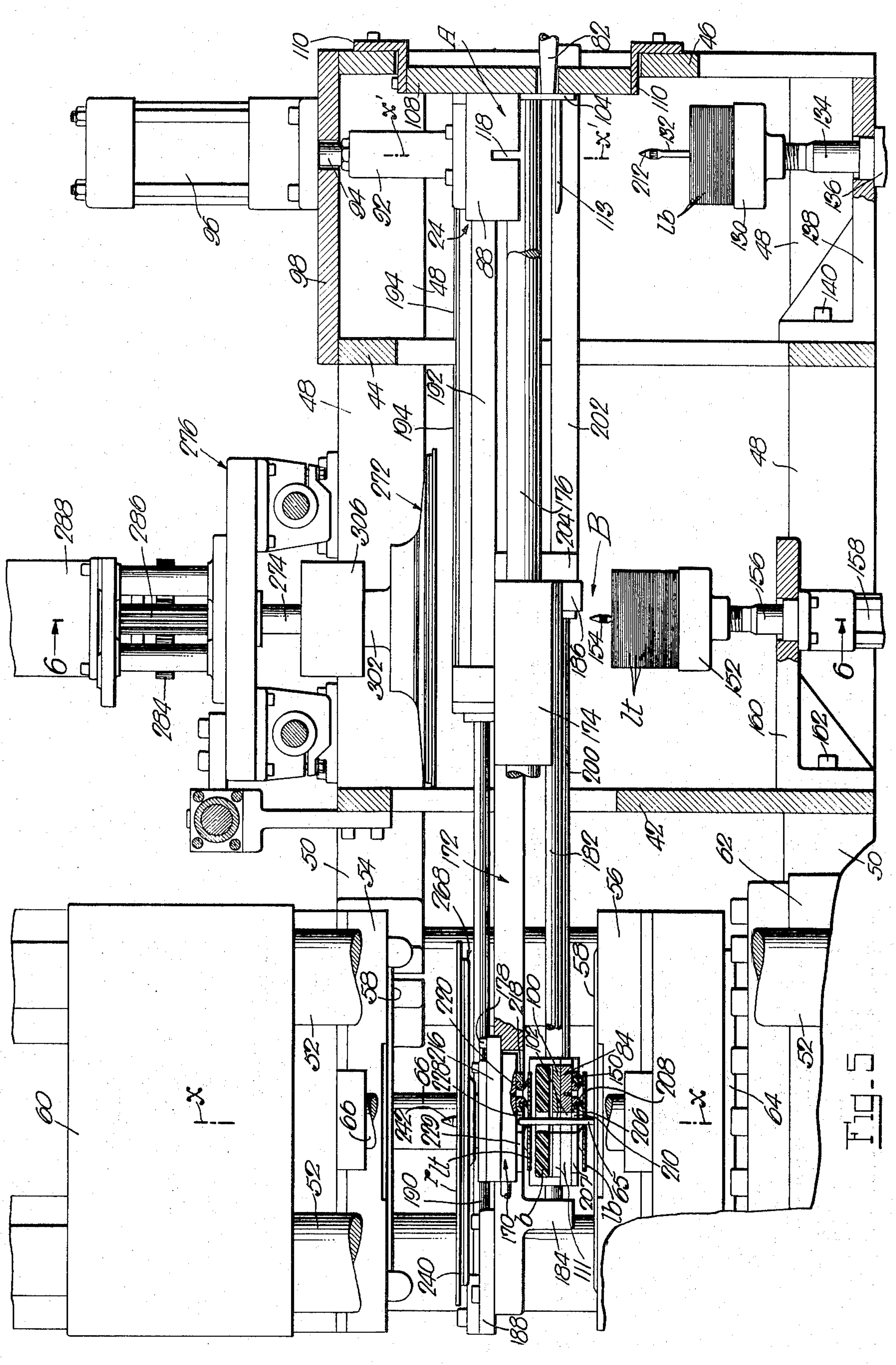
FIG. 5 is a section similar to FIG. 4, but showing certain operating components of the apparatus in different positions.

Owing to the fact that a formed biscuit *b* must be transferred from station A to the press 22 for its formation into a record *r* therein, the biscuit *b* must be removable from the cavity 68 which, therefore, must operationally be closed and opened. To the latter end, the bottom wall 72 of the cavity is formed by a biscuit carrier 84 which is movable from station A to the press 22 and back to station A for delivering successively formed biscuits to the press, and the top and peripheral walls 70 and 74, as well as the center core 76, of this cavity are raised and lowered to open the cavity and permit removal therefrom of a formed biscuit on the carrier 84 on movement of the latter from station A to the press, and to close the cavity for forming a biscuit, respectively. To this end, the peripheral cavity wall 74 is formed by the annular rim 86 of an inverted cup 88 which is movable coaxially of the axis *x'*, and which carries the center core 76 and in this instance also a disc 90 that provides the top wall 70 of the cavity, with the cup 88 being carried by a member 92 on a plunger 94 in a double-acting cylinder 96 on a mounting plate 98 on top of the intermediate and rear frame plates 44 and 46 (FIGS. 1, 2 and 4). In order effectively to seal the closed cavity 68 against leakage of plastic therefrom, the bottom wall 72 thereof is formed by an annular disc 100 on the carrier 84, with the cup rim 86 extending over the periphery of the disc 100 in the lower cavity-closing cup position, and the center core 76 then extending into a center bore 102 in the disc 100 and carrier 84 (FIGS. 4 and 11). Further, with the discharge nozzle 82 of the extruder being in fixed position, the injector port 78 in the cavity 68 is provided, not in the rim 86 of the movable cup 88, but in a fixed rail 104 which forms part of the peripheral cavity wall 74. To this end, the cup rim 86 is provided with an axial slot 106 in which the rail 104 is received with a slide fit (FIGS. 4, 10 and 12), with the cup 88 being also vertically guided on this rail 104 into its lower and upper positions (FIGS. 4 and 5). The rail 104 is in this instance carried by a bar 108 which by angles 110 is mounted on the rear frame plate 46. Also, for reasons explained hereinafter, the biscuit carrier 84 and the disc 100 thereon are provided with a slot 111 which leads from the center bore 102 therein (FIGS. 4 and 12), and in order to prevent the escape of plastic from the closed cavity 68 through this slot 111, there is provided on the rail 104 a forwardly projecting ledge 113 which covers the slot 111 and is also provided with a bore 115 for fitted extension therethrough of the center core 76. Accordingly, the disc 100 on the biscuit carrier 84 provides, not the entire bottom wall 72 of the cavity, but only the greater part thereof with the remaining smaller part of this bottom wall being formed by the ledge 113, and the latter being in register with a groove 117 in the disc 100 when the carrier 84 is at the biscuit-forming station A.

The disc 90 in the cup 88, which provides the top wall 70 of the cavity 68, is arranged to strip or eject a formed biscuit from the cup on its cavity-opening movement from the position in FIG. 4 to its upper position in FIG. 5. To this end, the disc 90 is by springs 112 (FIG. 11) normally urged into a position in which its wall surface 70 is flush with the open end 114 of the cup rim 86 (FIG. 4), and the biscuit carrier 84 is provided with a pair of stop lugs 116 on which the disc 90 comes to rest during a last stage of the descent of the cup 88 into its cavity-closing position, whereby the disc 90 is held back against the force of the springs 112 to locate the top wall 70 in the closed cavity 68 (FIG. 11), and this disc 90 will, on the following ascent of the cup, by spring-returned to the open end of the cup rim and thereby strip the formed biscuit from the cup into readiness for its transfer to the press by the carrier 84 on which it rests. The stop lugs 116 on the biscuit carrier 84 are arranged to be in the path of opposite peripheral margins of the disc 90 on its descent with the cup 88, and the stop lugs project to that extent into the interior confines of the cup (FIGS. 11 and 12), with the cup rim 86 being provided with axial slots 118 to clear the stop lugs and also seal the closed cavity thereat in the lower cup position. The disc 90 has in its periphery opposite notches 120 which the stop lugs 116 enter in order to be in the path of segments 122 on a diametrically reduced part of this disc, with the latter coming with its segments 122 into rest on the stop lugs (FIGS. 10 and 11). With the stop lugs 116 on the biscuit carrier 84 projecting into the interior confines of the closed cavity 68 (FIGS. 11 and 12), each biscuit being formed will be interlocked with the stop lugs, and this interlock between biscuit and stop lugs is relied on to hold the biscuit to the carrier 84 against inertial displacement thereon on its transfer by the latter to the press. However, the stop lugs 16 are arranged on the biscuit carrier 84 to leave the biscuit intact on its separation from the stop lugs when the biscuit is at the press positively held, in a manner described later, for removal from the biscuit carrier at the start of its return movement to the biscuit-forming station A. In this connection, the press 22 and the biscuit-forming station A are located on a predetermined path of movement of the biscuit carrier 84, with this path being in this instance a horizontal and rectilinear path *p* (FIGS. 1 and 2), and the stop lugs 116 are aligned with a cup diameter which extends normal to the path *p* (FIG. 12), whereby on forced separation of a biscuit from the carrier at the press the stop lugs will readily retract from their shallow interlock with the relatively soft biscuit without any significant deformation of the latter.

TOP AND BOTTOM LABEL SUPPLY MEANS

Also provided at the station A beneath the biscuit-forming means 24 is a supply of bottom labels **1*b* (FIGS. 2, 4 and 5), with these lables being stacked on a support 130 and received with their center holes on a center pin 132. The support 130 is carried at the upper end of a plunger 134 in a double-acting cylinder 136 on a bracket 138 which at 140 is mounted on the intermediate frame plate 44, and the center pin 132 is axially guided in the support 132 and projects into a center aperture 142 in the plunger 134 in which a seated and preloaded spring 144 bears against a collar 146 on the center pin 132 and normally urges the latter into the maximum projected position shown in FIG. 5. The support is by action of the plunger 134 moved into the retracted position shown in FIG. 5, and into raised position in which the topmost label in the stack is in transfer relation with a label transport 150 which in this instance is provided on the biscuit carrier 84** (FIG. 4).

Provided at a station B on the path *p* between the press and station A is a supply of top labels 1*t* (FIGS. 2, 4 and 5), with these labels being stacked on a support 152 and received with their center holes on a center pin 154. The support 152 is carried at the upper end of a plunger 156 in a double-acting cylinder 158 on a bracket 160 which at 162 is mounted on the front frame plate 42, and the center pin 154 is axially guided in the support 150, with this center pin being, by a preloaded spring in a center aperture in the plunger, normally urged into the maximum projected position shown in FIG. 5. The support 150 is by action of the plunger 156 moved into the retracted position shown in FIG. 5, and into raised position in which the topmost label in the stack is in transfer relation with another label transport 170 (FIG. 4).

BISCUIT AND LABEL TRANSFER MEANS

For the transfer of a formed biscuit *b* and of top and bottom labels 1*t* and 1*b* from the stations A and B into the press, there is provided a carriage 172 which is guided for movement on the path *p*. To this end, the carriage 172 has in the rear opposite side lugs 174 which are slidably received on parallel guide bars 176 mounted with their ends in the front and rear frame plates 42 and 46 (FIGS. 1 to 5 and also 10). Mounted at 178 on the carriage 172 is the aforementioned top label transport 170, and also mounted on this carriage 178, but for movement thereon in the direction of the path *p*, is the biscuit carrier 84 with the bottom label transport 150 thereon. To the latter end, the carrier 84 has opposite side lugs 180 which are slidably received on parallel guide bars 182 mounted with their ends in depending front and rear lugs 184 and 186 on the carriage 172 (FIGS. 4 to 7, 11 and 12). Connected with an arm 188 on the carriage 172 is the plunger 190 of a double-acting cylinder 192 which is carried by brackets 194 mounted at 196 on the intermediate frame plate 44 (FIGS. 1, 5 and 10). The carriage 172 is, by action of the cylinder 192 and plunger 190, operationally moved into the forward position in FIG. 5 in which the label transport 170 is with a top label 1*t* thereon centered on the reference axis *x* in the open press, and into the rear or home position in FIG. 4 in which the label transport 170 is at the station B in receiving relation with the topmost of the stacked top labels 1*t*. The biscuit carrier 84 is at 198 connected with a plunger 200 in a double-acting cylinder 202 which is carried on a depending rear lug 204 on the carriage 172 (FIGS. 5, 7, 11 and 12). The biscuit carrier 84 is, by action of the cylinder 202 and plunger 200, operationally moved on the carriage 172 into the forward position in FIG. 5 in which a formed biscuit *b* thereon in centered on a top label 1*t* on the label transport 170, and into the rear or home position in FIG. 4 in which the carrier 84 is, in the home position of the carriage 172, at the biscuit-forming station A.

The bottom-label transport 150 is in this instance in the form of a bottom disc 206 on the carrier 84 which carries suction cups 208 (FIGS. 4 and 11). The suction cups 208 are connectible with, and disconnectible form a suitable vacuum source through orifices in the disc 206 and carrier 84 and a conduit connection with an interposed control valve and including a flexible hose (neither shown). For the transfer of a bottom label 1*b* from the supply stack to the transport 150, the carriage 172 and biscuit carrier 84 are in their described home positions (FIG. 4), and the label support 130 is, by action of the cylinder 136 and plunger 134, raised until the topmost of the stacked bottom labels bears against the suction cups 208, whereupon the latter are connected with the mentioned vacuum source for retaining the topmost label, and the label support 130 is then returned to its lower position (FIG. 5). The disc 206 is provided with a center bore 210 in alignment with the center bore 102 in the carrier 84, with the center pin 132 on the label support 130 being, on the rise of the latter for a label transfer, carried into the aligned bores 210, 102 until its tip 212 comes into register with a seat 214 in the center core 76 in the lower position of the biscuit-forming cup 88 (FIGS. 4 and 11). For reasons explained hereinafter, the disc 206 is also provided with a radial slot 207 which leads from the center bore 210 therein and is aligned with the slot 111 in the carrier 84 (see also FIG. 5).

The top-label transport 170 (FIGS. 4 and 5) provides in this instance a casing 216 which at 178 is mounted on the carriage 172, and carries a bottom plate 218 with suction cups 220 which, through orifices in the plate 218 and casing 216, are in communication with a chamber 222 in the latter. The chamber 222 is through a conduit 224, including a flexible hose and interposed control valve, connectible with and disconnectible from, a suitable vacuum source for retaining a top label 1*t* on, and releasing it from, the suction cups 220. For the transfer of a top label 1*t* from the supply stack to the transport 170, the carriage 172 is in its home position (FIG. 4), and the top-label support 152 is, by action of the cylinder 158 and plunger 156, raised until the topmost of the stacked labels 1*t* bears against the suction cups 220 for its vacuumatic retention by the latter, whereupon the label support 152 is returned to its lower position (FIG. 5). The casing 216 of the label transport 170 also carries a seat 226 in which the tip of the center pin 154 on the label support 152 comes to rest on the rise of the latter for a label transfer, with this center pin 154 reaching the seat 226 through a center aperture 228 in the casing 216 and bottom plate 218 thereon (FIG. 4). For a reason explained hereafter, the bottom plate 218 is also provided with a slot 229 which leads from the center aperture 228 therein.

With the carriage 172 extending in its home position to the rear frame plate 46 (FIG. 10), and the biscuit cup 88 in its lower cavity-closing position being below the top of the carriage 172 (FIG. 4), the carriage 172 is in its rear provided with a recess 230 to clear the cup 88. Further, a biscuit *b* on the carrier 84 is at a horizontal level which is below that of a top label 1*t* on the transport 170 (FIGS. 4 and 5).

Once a biscuit *b* is formed on the carrier 84 and the cup 88 raised to its upper position, and bottom and top labels transferred to the respective transports 150 and 170 and the label supports 130 and 152 lowered, the carriage 172 and carrier 84 are, by action of their respective cylinders 192 and 202 and plungers therein, moved substantially simultaneously to their respective foward positions, whereby the biscuit on the carrier 84 and the labels on the transports 150 and 170 are carried into the then open press into the position in FIG. 5 in which the top and bottom labels 1*t* and 1*b* and the biscuit *b* therebetween are centered on the reference axis *x* of the press, with the center pin 65 in the lower press platen 56 being, however, retracted in the latter when the carriage 172 and the carrier 84 arrive in the position in FIG. 5. After arrival of the carriage 172 and the carrier 84 in the position in FIG. 5, the center pin 65 is hydraulically operated into full projection from the lower press platen 56, thereby passing through the aligned center holes of the biscuit and labels and the center bores 102 and 210 in the carrier 84 and label transport disc 206 thereon, and into the center aperture 228 in the top transport plate 218 (FIG. 5). The vacuumatic hold of the top and bottom labels on the respective transports 170 and 150 is then released, whereupon the carriage 172 and carrier 84 are returned to their respective home positions in FIG. 4. The then fully projecting center pin 65 on the lower press platen 56 does not interfere with the return of the carriage 172 and carrier 84 to their home positions due to the clearance slots 207, 111 and 229 in the lower label transport disc 206, carrier 84 and upper label transport plate 218 (see also FIG. 7), but this projecting center pin 65 will retain the top and bottom labels and the biscuit therebetween in the open press, with these labels and biscuit then dropping onto the lower press platen 56. The press will next be closed by upward movement of the lower press platen 56, with the center pin 65 being on engagement with the stamper on the upper press platen 54, forced into the lower press platen until reaching the position in FIG. 4 when the press is closed. In the course of closing the lower platen 56 on the upper platen 54, the biscuit will be pressed into a record *r* with the center hole *h* and peripheral flash *f* and with the top and bottom labels on its opposite faces, and the press then remains closed to the end of the usual molding cycle, whereupon the press is opened for removal of the molded record.

RECORD TRIMMING MEANS

The trimming means 32 perform to remove the peripheral flash from a molded record *r* while the same is supported at the station B on a flat horizontal surface 240 with a projecting pin 242 on which the record is then located with its center hold *h* (FIG. 4). The record support surface 240 also serves for the transfer to-be-described of a molded record from the press to the "trimming" station B, and this surface 240 is to that end provided on the carriage 172. The trimming means 32 at the station B are in this instance in the form of power-driven companion shear discs 244 and 246 on shafts 248 and 250, respectively, which are mounted for rotation in a suitable supported bracket 251 in the frame 40 (FIGS. 2, 6 and 10). The shafts 248 and 250 are drivingly connected by gears 252 and 254, of which gear 252 carries a sprocket wheel 256 which by a chain 258 is drivingly connected with a sprocket wheel 260 on the output shaft 262 of changespeed gearing 264 mounted on the bracket 251 and carrying a drive motor 266, with the latter preferably running constantly for continuous drive of the shear discs 244, 246. For the performance of the drive shear discs 244, 246 on a record, the latter must be turned, and its support surface 240 is to that end provided by a turntable 268 on the carriage 172, with the record-locating pin 242 being the center pin on the turntable. The turntable 268 is turnably mounted in this instance in the casing 216 of the top-label transport 170 through intermediation of an antifriction bearing 270 (FIG. 4). For the drive of a record on the turntable 268 for a trimming operation, there is also provided at the trimming station B a power-driven operating disc 272 coaxial with the turntable and axially movable down and up into and from frictional drive engagement with a record on the turntable. The operating disc 272 is carried at the lower end of a shaft 274 which, for operational up and down movement of this disc, is guided for axial movement in an overhead support 276, and is through an antifriction bearing 278 carried by a fixed connecting member 279 on a plunger 280 in a double-acting cylinder 282 on top of the support 274. For the drive of the operating disc 272, its shaft 274 carries a gear 284 which is in mesh with a pinion 286 turnably mounted in the support 276 and connected with a drive motor 288 on top of the support 276 (see also FIG. 6). Thus, on lowering the operating disc 272 with its preferred rubber pad 290 into frictional drive engagement with a record on the turntable 268 and driving this disc 272, the record will be driven for a trimming operation.

The operating disc 272 is also called upon to participate in the hereinafter described transfer of a trimmed record from the trimming station B to a record collecting station C (FIGS. 1 and 6) by carrying the trimmed record for such transfer. To this end, the operating disc 272 is provided with suction cups 298 which are carried by a fixed member 300 in a center recess in this disc, with these suction cups 298 being connectible with, and disconnectible from, a suitable vacuum source. To the latter end, the operating disc 272 is provided with a cylindrical shank 302 which is mounted on the lower end of the shaft 274, and is also journalled in a center aperture 304 in a head 306 which by an antifriction bearing 308 is held to, and hence axially movable with, the shaft 274, but is held against rotation by suitable means (not shown). The shank 302 of the operating disc 272 is within the confines of the center aperture 304 in the head 306 provided with a peripheral groove 310 which through an orifice 312 is in communication with the suction cups 298 (FIG. 4), with the peripheral groove 310 being connectible with a suitable vacuum source through conduit means, including an orifice in the head 306, a flexible hose and a control valve (neither shown).

RECORD TRANSFER MEANS

As already mentioned, the turntable 268 on the carriage 172 also serves to transfer a molded record from the open press to the trimming station B, and the turntable is to this end in the open press in the forward position of the carriage 172 (FIG. 5), ready to receive a molded record on separation of the same from the stampers 58 on the press platens 54 and 56.

For separation of a molded record from the stampers 58, there are provided two pairs of companion fingers 314 and 316 (FIGS. 2 and 7 to 9). The fingers 314 and 316 of each pair are at 318 and 320 pivoted on a pin 322 carried by spaced ears 324 on an arm 326 on which the lower finger 316 rests, with this arm 326 having spaced rear prongs 328 which at 330 are pivoted on spaced depending lugs 332 of a bracket 334 that is mounted on the upper press platen 54. Each bracket 334 pivotally supports at 336 a double-acting cylinder 338 with a plunger 340 which at 342 is connected with the rear prongs 328 of the associated arm 326, and the rear prongs 328 of the arm 326 pivotally support at 344 a double-acting cylinder 346 with a plunger 348 which at 350 is connected with spaced depending legs 352 on the upper finger 314. The action of each cylinder 338 and plunger 340 is to rock the associated arm 326 about its pivot support 330 into the lowered and raised positions in FIGS. 7 and 8, respectively, and the action of each cylinder 346 and plunger 348 is to rock the associated upper finger 314 away from and toward its associated lower finger 316.

In operation of the fingers 314 and 316, and while the press is still open immediately after retraction of the carriage 172 to its home position and delivery of a biscuit and top and bottom labels on the lower press platen 56, the fingers 314 and 316 are still in the relative positions in FIG. 7 in which they released the last separated record onto the turntable 268 in the forward position of the carriage 172, with the lower fingers 316 then resting on the respective arms 326 in their lowered positions, and the upper fingers 314 being, by action of their cylinders 346 and plungers 348, held at maximum spacing from the respective arms 326. The lower fingers 316 are then in the path of the subsequently rising lower platen 56, and more particularly of recesses 354 in the latter (FIG. 8), so that on the next closing of the press these recesses on the platen 56 will take along the lower fingers 316 into the positions in FIG. 8, with the arms 326 being, by action of their cylinders 338 and plungers 340, also returned to their upper positions, and the upper fingers 314 being, by action of their cylinders 346 and plungers 348, still urged away from the respective arms 326 and into recesses 356 in the upper platen 54, whereby the fingers 314, 316 of each pair are in the closed press spaced by a gap *g* into which runs the peripheral flash *f* of a record being molded (FIG. 8). In next opening the press after the conclusion of the molding cycle, the arms 326 and thereon resting lower fingers 316 will remain in the position in FIG. 8, and the fingers 314 will, by action of their cylinders 346 and plungers 348, have meanwhile been closed on the flash *f* to thereby grip the latter between the fingers 314 and 316 and thus assume hold of the record, whereby the latter is separated or peeled from the stamper on the retracting lower platen 56. The record is thus held by the fingers 314, 316 until after opening of the press the carriage 172 and carrier 84 thereon are moved to their respective forward positions (FIG. 5), whereupon the arms 326 and lower fingers 316 resting thereon are, by action of the cylinders 338 and plungers 340, lowered (FIG. 7) while the upper fingers 314 continue to grip the flash *f*, whereby the record is separated or peeled from the stamper on the upper press platen 54 and lowered onto the turntable 268 with its center hold *h* into register with the aligned center pin 242 on the turntable. Once the lowering record is with its center hole *h* in register with the center pin on the turntable, the upper fingers 314 are, by action of their cylinders 346 and plungers 348, retracted from gripping engagement with the flash *f* (FIG. 7) to thereby release the record for its sole support on the turntable ready to be carried on the latter to the trimming station B on the following return stroke of the carriage 172 and carrier 84 to their respective home positions (FIG. 4). To avoid interference of the fingers 314, 316 with the transfer of the record on the turntable from the press to the trimming station B, the fingers of the opposite pairs are centered on a line L which extends normal to the path *p* on which the carriage 172 travels (FIG. 1). On releasing the record for its support on the turntable 268, the fingers 314, 316 will remain in the relative positions in FIG. 7, ready for a repeat of their described cyclic operation in the next operating cycle of the press. The fingers 314, 316 of both pairs and the associated arms 326 are provided with apertures 358 with which to clear the respective depending posts 66 on the upper press platen 54 (FIGS. 8 and 9).

In transferring the record on the turntable 268 from the open press to the trimming station B on the return of the carriage 172 to its home position (FIGS. 4 and 10), the record will be carried with its flash *f* into cutting relation with the driven shear discs 244 and 246, with the result that the latter will have cut into the flash *f* along the line 360 when the carriage 172 reaches its home position (FIG. 10), whereupon the operating disc 272 will be lowered and driven to drive the record and turntable against the shear discs 244, 246 for severing the flash from the record and thereby finish its periphery, with the severed flash dropping into a bin therebelow (not shown).

RECORD STACKING MEANS

There is provided at the record collecting station C a horizontal table 370 on which to stack finished records *r* with their center holes *h* in register with a center pin 372 on the table 370 (FIGS. 1, 3 and 6). The table 370 is mounted on a side bracket 374 on the frame 40 of the apparatus.

OTHER RECORD TRANSFER MEANS

As already mentioned, the operating disc 272 also functions to carry a trimmed or finished record from the trimming station B to the collecting station C for delivery there to the stacking table 370. To this end, the overhead support 276 for the operating disc 272 is arranged as another carriage for operational movement from the trimming station B to the collecting station C and back to the trimming station B. Thus, the overhead support 276 is provided with depending brackets 376 which are slidably received on parallel guide bars 378 which in this instance extend horizontally and normal to the travel path *p* of the "main" carriage 172 (FIGS. 1, 4 and 6), with the guide bars being with their ends mounted in upright brackets 380 on opposite side plates 48 of the frame 40 of the apparatus. For operational movement of the overhead support or carriage 276 to and from the trimming and collecting stations B and C, there is provided a double-acting cylinder 382 with a plunger 384 which by a member 386 is connected with the overhead carriage 276 (FIGS. 1 and 4), with the cylinder 382 being mounted on suitable brackets 388 on top of the frame 40.

On the return of the main carriage 172 to its home position with a molded record *r* on the turntable 268 (FIG. 4), the overhead carriage 276 is at the trimming station B, with the operating disc 272 being then in axial alignment with, but in its upper position and, hence, spaced from, the record on the turntable. Next, the operating disc 272 is, by action of the cylinder 282 and plunger 280, lowered into frictional driving engagement with the record on the turntable, with the operating disc 272 being driven for the drive of the record against the driven shear discs 244, 246 to conclude the trimming of the flash *f* from the record. Prior or subsequent to the conclusion of the trimming operation, the suction cups 298 on the operating disc 272, which are then in engagement with the top label on the record, are connected with their aforementioned vacuum source so that on the following operational rise of the operating disc to its upper position (FIG. 5), the trimmed record will vacuumatically be held on this disc, and will continue to be held on the latter during the following traverse of the overhead carriage 276 from the trimming station B to the collecting station C (FIG. 6) at which the record is aligned with the stacked records and will drop on the topmost of the stacked records on disconnecting the vacuum cups 298 from their vacuum source.

The operating disc 272 is driven from the electric motor 288 when this disc 272, on its operational movement from its upper to its lower position at the trimming station B, causes closing of a normally open switch 390 (FIG. 4) to thereby close the circuit of the motor 288, and the power-drive of the operating disc 272 is interrupted when on the following operational movement of this disc to its upper position at station B the switch 390 returns to its normally open position and thereby opens the circuit of the motor 288. The switch 390 is in this instance carried by the overhead carriage 276 (FIG. 4), and this switch is connected through suitable leads 392 and 394 with an electric power source 395 and through leads 396 with the motor 288. The fixed connecting member 279 on the plunger 280 carries an arm 398 which on operational descent of the operating disc 272 to its lower position closes the switch 390 for closing the motor circuit via the leads 392 to 396, with this arm 398 retracting from the switch 390 and thereby permitting the latter to return to its normally open position on the following operational rise of the operating disc 272 to its upper position.

The apparatus is designed for fully automatic performance of its operating components in timed relation with each other, and to this end provides, besides the control elements mentioned hereinbefore, other control elements, and suitable means for operating the various control elements in timed relation with each other. However, since the control over automatic and timed performance of the operating components of the apparatus forms no part of the present invention, neither additional control elements, nor means for operating the various control elements in timed relation with each other, are shown or described.

What is claimed is:

1. In record producing apparatus, the combination of a press with upper and lower companion platens, of which said upper platen has a vertical reference axis, and said platens are relatively movable vertically to and from each other to close and open the press, respectively, for molding in the closed press a plastic biscuit into a record with peripheral flash and a center hole centered on said reference axis; a record finishing station remote from said press; record transfer means providing a support with a flat top surface and a projecting center pin thereon, and means guiding said support for movement, with its top surface in substantially horizontal disposition, into one position in the open press beneath said upper platen and with its center pin coaxial with said reference axis, and into another position at said station; means at the press operative to hold a molded record at its peripheral flash and separate the record from said platens on opening the press, and to lower the separated record onto and release it on said top surface with its center hole in record-locating register with said pin in said one position of said support, with said top surface being of an area to support a released record thereon inside its peripheral flash and over a sufficient expanse to avoid substantial sagging of the record; and means at said station operative to trim the flash from a record while supported and located on said top surface in said other position of said support.

2. The combination in record producing apparatus as in claim 1, in which said top surface is provided by a turntable on said support, and there is further provided at said station a power-driven operating disc movable, coaxially of said turntable in said other position of said support, into upper and lower positions spaced from and in frictional driving engagement with a record on said turntable, respectively, and said trimming means are a pair of power-driven companion shear discs at a fixed location to cut into the flash of a record on said turntable on movement of said support into said other position, and trimming the peripheral flash from the record when driven by said operating disc.

3. The combination in record producing apparatus as in claim 2, which further provides other record transfer means, including said operating disc, and further comprising a carriage mounting said operating disc for said axial movement thereof, and being guided for movement into first and second positions in which said operating disc is coaxial with said turntable in said other position of said support and is at a record delivery station remote from said record finishing station, respectively, and vacuumatic record holding means on said operating disc operative to hold a record on and release it from said operating disc.

4. In record producing apparatus, the combination of a press at a first station on a predetermined path, with said press having upper and lower platens, of which said upper platen has a vertical reference axis and said platens are relatively movable vertically to and from each other to close and open the press, respectively, for molding in the closed press a plastic biscuit into a record with peripheral flash and a center hole centered on said reference axis; flash trimming means and biscuit forming means at second and third stations on said path, respectively, of which said second station is between said first and third stations; and means for transferring a biscuit from said forming means to the press and a molded record from the press to said second station, including a first carriage having a flat top surface with a center pin, and being guided for movement, with said top surface in substantially horizontal disposition, along said path toward and away from said first station into first and second positions in which said top surface is in the open press underneath said upper platen and with its center pin coaxial with said reference axis and is at said second station, respectively, a biscuit carrier mounted on said carriage for movement therewith and for independent movement thereon along said path, with said independent movement being toward said first station into one position in which a carried biscuit is underneath said carriage surface and substantially centered on said center pin, and away from said first station into another position in which the carrier is at said third station when said carriage is in said second position, and means at the press operative to hold a molded record at its peripheral flash and separate the record from said platens on opening the press, and to lower the separated record onto and release it on said top surface with its center hole in record-locating register with said center pin in said first position of said carriage, with said top surface being of an area to support a released record thereon inside its peripheral flash and over a sufficient expanse to avoid substantial sagging of the record, and said trimming means being operative to trim the flash from a record while supported and located on said top surface in said second carriage position.

5. The combination in record producing apparatus as in claim 4, in which said path is a horizontal rectilinear path.

6. The combination in record producing apparatus as in claim 5, which further provides a double-acting cylinder with a plunger, of which said cylinder is mounted on said carriage, and said plunger is connected with said carrier, for moving the latter on said carriage into said one and said other position.

7. The combination in record producing apparatus as in claim 4, in which said top surface is provided by a turntable on said carriage, and there is further provided at said second station a power-driven operating disc movable, coaxially of said turntable in said second carriage position, into upper and lower positions spaced from and in frictional driving engagement with a record on said turntable, respectively, and said trimming means are a pair of power-driven companion shear discs at a fixed location to cut into the flash of a record on said turntable on movement of said carriage into said second position, and trimming the peripheral flash from the record when driven by said operating disc.

8. The combination in record producing apparatus as in claim 4, which further provides a supply of bottom labels at said third station, and said transfer means also transfer a label from said supply to the press, with said carrier holding a bottom label beneath a biscuit thereon, and there is also provided at said second station another supply of top labels, with said transfer means also transferring a top label from said other supply to the press, and said carriage carrying a top label beneath said top surface thereof.

9. The combination in record producing apparatus as in claim 5, in which said upper press platen is fixed and said lower press platen is movable up and down to close and open the press, respectively, said record holding means are two pairs of companion fingers pivoted on said upper press platen about respective axes parallel to said path for opening and closing the fingers of each pair, and located for engagement with peripheral portions, respectively, of the flash on a record being molded which are opposite each other and centered on the record diameter which extends normal to said path, and means for rocking the fingers of said pairs to close on and grip said peripheral flash portions of a record in the closed press and to lower the peripherally gripped record onto, and release it to, said top surface in said first carriage position.

10. The combination in record producing apparatus as in claim 4, in which said biscuit forming means provides a mold cavity having top and bottom walls and a peripheral wall annular about a vertical axis, of which said bottom wall is formed by said carrier when at said third station, said peripheral wall is formed by the rim of an inverted cup movable axially into upper and lower positions in which said cavity is open and closed, respectively, and said top wall is formed by a disc in said cup spring-urged toward the open end of the latter, and fixed means on which said disc comes to rest on downward movement of said cup before the latter reaches said lower position to thereby establish said disc as the top wall of the closed cavity, with said disc stripping a formed biscuit from the cup on upward movement of the latter from its lower position.

11. The combination in record producing apparatus as in claim 10, in which said fixed means are a pair of upright lugs on said bottom wall on opposite sides of said cup and in line with a diameter thereof normal to said path, with said lugs having top rest surfaces in the path of opposite peripheral margins of said disc on downward movement of the latter with said cup, and said cup rim having axial slots receiving said lugs with a slide fit on movement of said cup into said lower position, whereby said lugs are also interlocked with a formed biscuit on said carrier during transfer from said third station to the press.

12. The combination in record producing apparatus as in claim 4, in which said top surface is provided by a turntable on said carriage, and there is further provided at said second station a rotary operating disc movable, coaxially of said turntable in said second carriage position, into lower and upper positions in which the same holds a record on said turntable and is raised from said turntable, respectively, with said trimming means being operative to trim the peripheral flash from a record when held by said operating disc to said turntable and turning therewith.

13. The combination in record producing apparatus as in claim 12, which further provides other record transfer means, including said operating disc, and further comprising another carriage mounting said operating disc for said axial movement thereof, and being guided for movement into first and second positions in which said operating disc is coaxial with said turntable at said second station of said first carriage and is at a record delivery station remote from the other stations, respectively, and vacuumatic record holding means on said operating disc operative to hold a record on and release it from said operating disc.

14. The combination in record producing apparatus as in claim 13, which further provides record stacking means at said delivery station in receiving relation with a record held on the operating disc in said second position of said other carriage, and receiving the record when released from the operating disc in said second position of said other carriage.

15. The combination in record producing apparatus as in claim 13, in which said path is a horizontal rectilinear path, and said other carriage is guided for horizontal rectilinear movement normal to said path.

* * * * *